United States Patent [19]
Ying et al.

[11] 3,818,256
[45] June 18, 1974

[54] TUBE-TENSION DEVICE FOR WATER COOLED TURBINE GENERATOR ROTORS

[75] Inventors: Sui C. Ying; James E. Luzader, both of Monroeville, Pa.

[73] Assignee: Westinghouse Electric Corporation, Pittsburgh, Pa.

[22] Filed: Jan. 29, 1973

[21] Appl. No.: 327,521

[52] U.S. Cl................................. 310/59, 310/64
[51] Int. Cl. ........................................... H02k 9/00
[58] Field of Search............ 310/54, 52, 57, 58, 59, 310/60, 61, 64; 340/147

[56] References Cited
UNITED STATES PATENTS

| | | | |
|---|---|---|---|
| 3,131,321 | 4/1964 | Gibbs | 310/54 |
| 3,353,043 | 11/1967 | Albright | 310/61 |
| 3,393,333 | 7/1968 | Kudlacik | 310/61 |
| 3,469,127 | 9/1969 | Eggemann | 310/54 |
| 3,524,090 | 8/1970 | Sark | 310/58 |
| 3,733,501 | 5/1973 | Heller | 310/54 |
| 3,740,596 | 6/1973 | Curtis | 310/54 |

*Primary Examiner*—R. Skudy
*Attorney, Agent, or Firm*—G. H. Telfer

[57] ABSTRACT

A water cooled rotor for a large turbine generator in which the water coolant is discharged through a corrosion resistant tube extending through the bore of the rotor shaft. In order to accommodate differential thermal expansion of the corrosion resistant tube, the tube is pre-stressed in tension against a bracing member.

7 Claims, 7 Drawing Figures

TUBE-TENSION DEVICE FOR WATER COOLED TURBINE GENERATOR ROTORS

BACKGROUND OF THE INVENTION

1. Field of the Invention

The present invention relates to the cooling of dynamoelectric machines, and more particularly to a liquid cooled rotor for machines of large size such as turbine generators.

2. Description of Prior Art

Large turbine generators are usually of the inner cooled, or direct cooled, construction in which a coolant fluid is circulated through duct means in the stator and rotor slots in direct thermal relation with the current-carrying members inside the ground insulation. This type of construction provides a very effective cooling system and has made it possible to greatly increase the maximum rating obtainable in large generators without exceeding the permissible limits of physical size. The coolant used in these machines has usually been hydrogen which fills the gas-tight housing and is circulated by a blower on the rotor shaft through the ducts of the stator and rotor windings and through suitable ducts in the stator core.

As the maximum ratings required in large generators have continued to rise, it has become necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding. A substantial further improvement can be obtained by applying liquid cooling to the rotor by circulating water or other suitable liquid through passages in the rotor windings.

There are many problems involved in circulating a liquid coolant through the rotor of a large generator. One of the most difficult problems is that of introducing the water into the rotor and discharging it therefrom. This is preferably done as close to the axis of the rotor as possible where the pressure of the liquid is at its lowest value. One suitable construction for this purpose is shown in U.S. Pat. No. 3,733,502 issued to L. P. Curtis et al., and assigned to the assignee of the present invention. In this construction, the liquid is introduced through an annular passage in the axial bore at one end of the rotor shaft. The coolant flows from this passage through radial passages to a distribution chamber on the rotor surface from which it is directed into the passages in the winding conductors. At the discharge end of the rotor, the coolant flows from the conductors to a collection chamber and through radial passages to the central bore of the rotor. The coolant flows through the axial bore of the shaft and through another set of radial passages into a discharge chamber. The coolant is then discharged from the rotor in any convenient fashion.

Since the heated water flowing through the passages in the rotor can be corrosive, it is necessary to protect the steel used in fabricating the rotor from corrosion. This is done in prior art generators by providing liners for all passages through which the water flows. These liners may be made of any suitable corrosion resistant material but are preferably made of stainless steel. When stainless steel liners are used in this manner, the liners become heated from the heated water flowing through them and tend to expand more than the steel rotor, both because they are at a somewhat higher temperature and because they may have a greater coefficient of thermal expansion than the special alloy steel of which the rotor is usually made. Excessive stresses and possible damage can therefore result if provision is not made to accommodate this differential thermal expansion of the liner. When a long tubular liner such as is used in the bores of the rotor shaft is utilized, it is possible in some instances to provide for the thermal expansion of the liner by anchoring it at one end only and permitting it to move axially relative to the shaft, as shown for example at the entrance end of the rotor in the above-mentioned Curtis et al. patent. This solution of the problem however, it not available where the liner must be attached at both ends to fixed points in the rotor. At the discharge end of the rotor in prior art generators, the water flows through a set of radial passages to the bore of the shaft and through the bore to a second set of radial passages near the end of the shaft through which it is discharged. The stainless steel liner in the shaft bore between the two sets of radial passages must be anchored to the radial stainless steel tubes in the radial passages at both ends, and if the liner is a substantial length, as is the case in very large generators for which the invention is intended, the differential thermal expansion will be sufficient to stress the radial tubes beyond permissible limits.

In the prior art, various methods for accommodating the differential thermal expansion of the liner have been utilized. In U.S. Pat. No. 3,740,595 issued to P. R. Heller et al., now U.S. Pat. No. 3,740,595, and assigned to the assignee of the present invention, a bellows device is disposed within the liner itself, at a point in the liner intermediate the points of attachment of the liner to the rotor. However, the walls of the bellows must be necessarily thin to provide the required flexibility so that any corrosion, erosion or cavitation at this point would be critical. In addition, the convolutions of the bellows tend to catch and hold corrosion debris because of centrifugal effects which may lead to local pitting corrosion. It has been proposed that, the differential thermal expansion of the liner be accommodated by prestressing the liner in tension against a concentric bracing tube. As the liner expands due to the passage of the heated water through it, the resultant of the tension force in the liner, the corresponding compression force in the bracing tube, and the force of thermal expansion, is a net deflection in the liner that is less than that of an unrestrained liner.

An object of this invention is to provide a method for transmitting the heated water which has been passed through the rotor field windings to the discharge chamber at the extreme end of the rotor. Using a plurality of pre-shaped and pre-stressed stainless steel tubes, the heated water is conducted through the rotor bore to the discharge chamber.

SUMMARY OF THE INVENTION

In the present invention the fluid coolant which is passed through the winding passages is collected and transmitted to a discharge chamber at the extreme end of the rotor by means of stainless steel tubes. In the prior art the water flowed radially inward from the collection chamber to the axial bore, axially along the bore, and radially outward through another set of radial passages to the discharge chamber. The present invention provides a stainless steel tube which has a first radial portion, an axial portion, and a second radial portion. The water is transmitted from the collection chamber through the first radial portion of the stainless steel tube, through the axial portion of the stainless steel tube, and into the second radial portion of the tube which is connected to the discharge chamber. The present method has the advantage of eliminating a weld which is required between the radial passage liners and the axial bore liner. In the prior art, depending on the size of the generator, the weld between the radial passage liners and the bore liners was from 4 to 20 inches from the rotor surface. Utilizing the pre-shaped tube, no welding between the liners in the radial passages and the axial bore liner is required. The invention also provides for useful differential pressure at the discharge end of the rotor not available previously, since the axis of the pre-shaped tube does not coincide with the axis of the shaft bore, but lies along an axis which is a radial distance outward from the axis of the bore. Any differential thermal expansion of the stainless steel tube is accommodated by pre-stressing the stainless steel tubes against a bracing member. By pre-stressing the stainless steel tubes, the differential thermal expansion is confined within permissible limits.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
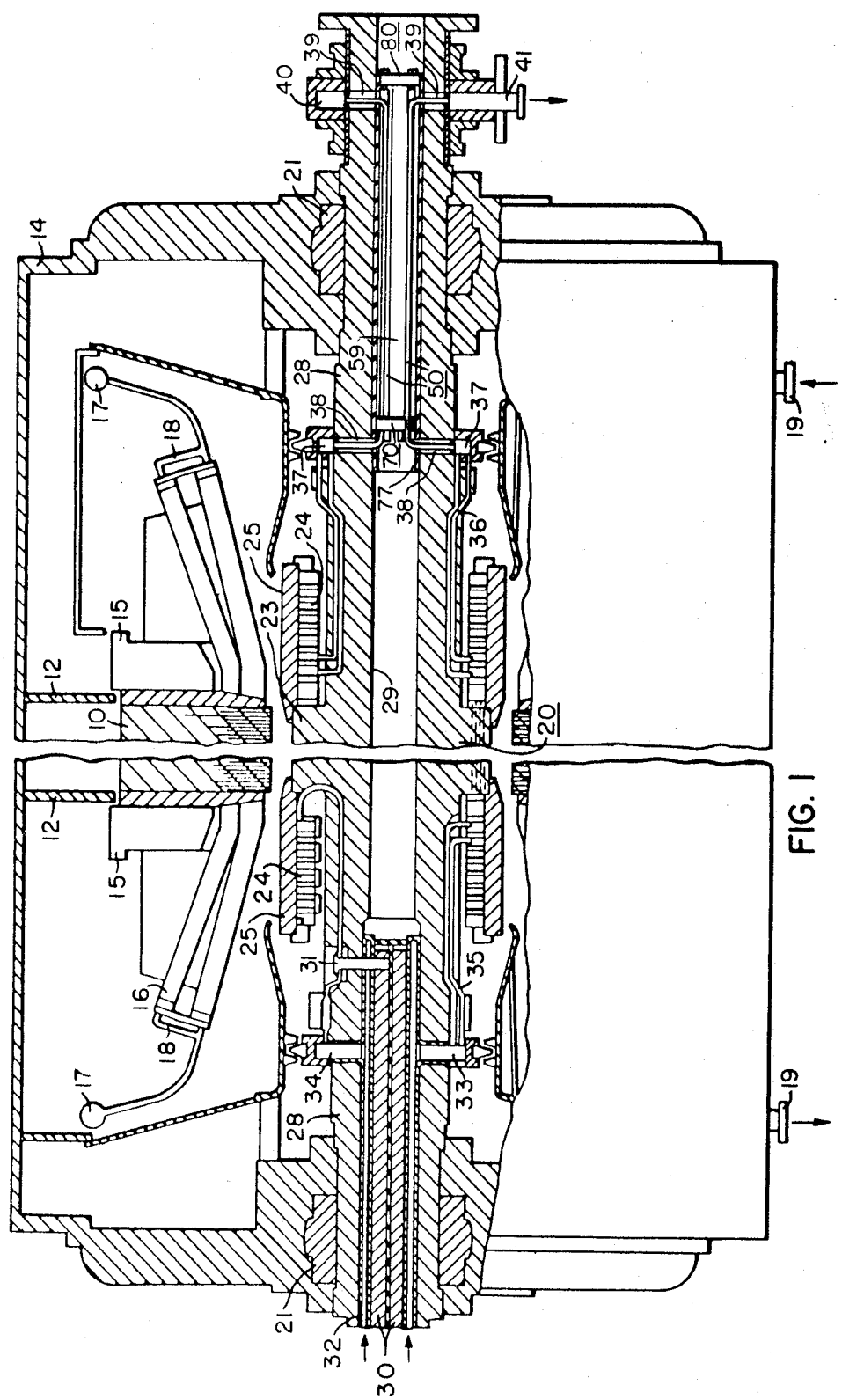
FIG. 1 is a view in longitudinal section, partly in elevation, of a turbine generator having a liquid cooled rotor embodying the invention.

Throughout the following description similar reference characters refer to similar members in all figures of the drawings.

Referring to FIG. 1 of the drawings, the invention is shown embodied in a large turbine generator of typical construction although it should be understood that the rotor of the present invention may be used in any desired type of dynamoelectric machine.

As shown, the generator has a stator core 10 supported by frame rings 12 in a substantially gas-tight outer housing 14. The stator core 10 is of the usual laminated construction, having a generally cylindrical bore therethrough, and the laminations are clamped between suitable end plates 15 in the usual manner. The stator core 10 has longitudinal slots in its inner periphery for the reception of a stator winding 16 which may be of any suitable type but which is shown as being a liquid cooled winding. For this purpose circular inlet and discharge manifolds 17 are provided at opposite ends of the generator and connected through suitable means, generally indicated at 18, to circulate a coolant fluid such as water through the coils of the stator winding 16. The manifold 17 may be connected as indicated diagrammatically at 19 to an external recirculating system of any desired type. The construction of a liquid cooled stator suitable for use with the present invention is shown in U.S. Pat. No. 3,634,705, issued to F. P. Fidei, and assigned to the assignee of the present invention, although other suitable constructions might be used. The housing 14 is filled with a coolant gas, preferably hydrogen, which is circulated through the interior of the housing to cool the stator core by flow through the usual radial cooling ducts, and suitable baffling of any desired type may be provided in the housing to direct the flow of gas therein.

The generator has a rotor member 20 which is disposed in the bore of the stator core 10 and supported in bearings 21 at the end of the housing 14. The bearing assemblies preferably include gland seals to prevent leakage of gas along the rotor shaft. The bearings and gland seals may be of any suitable or usual construction and have not been illustrated in detail as they are not a part of the invention. The rotor 20 has a central body portion 23 which is provided with peripheral slots in the usual manner for the reception of a rotor winding 24. The rotor winding 24, which is the field winding of the generator, may be of any suitable type and is constructed of copper conductors which extend longitudinally through the slots of the rotor body and generally circumferentially in the end turned portions which are visible in the drawing. The end turns of the rotor winding are supported against rotational forces by the usual heavy retaining rings 25. The winding conductors 24 are made hollow with central passages extending through them through which the coolant liquid flows from one end to the other through both the circumferential and turn portions and the straight longitudinal portions. Any suitable or desired type of flow pattern may be utilized for the coolant flow, and any desired type of electrical circuit may be used.

The rotor 20 has shaft portions 28 extending axially from the body portion 23 at each end thereof and including journal portions supported in the bearing 21. The shaft portions 28 have an axial bore 29 extending therethrough and, in accordance with the usual practice, the bore preferably extends for the entire length of the rotor as shown. In the illustrated embodiment of the invention, axial electrical leads 30 extend through the bore 29 at the left-hand end of the rotor, as viewed in the drawing, and are connected to the rotor winding by means of radial passages 31. The coolant liquid, which is preferably water, is introduced at this end of the rotor through an annular passage 32 which surrounds the leads 30 in the bore 29 and which is connected to an distribution chamber 33 by radial passages 34. The distribution chamber 33 extends circumferentially around the surface of the rotor shaft 28 and is connected by generally axial connectors 35 of any suitable type to the conductors 24 of the rotor winding. The annular passage 32 may be made of two concentric tubes of stainless steel or other suitable corrosion resistant material, and thus serves the purpose of a corrosion resistant liner for the shaft bore 29. The tubes of which the annular passage 32 is made are anchored at the inner end to tubular stainless steel liners in the radial passages 34. The tubes 32 are otherwise free to expand axially in the bore 29 to provide for differential thermal expansion as more fully explained in the abovementioned Curtis et al. patent.

Figure 2:
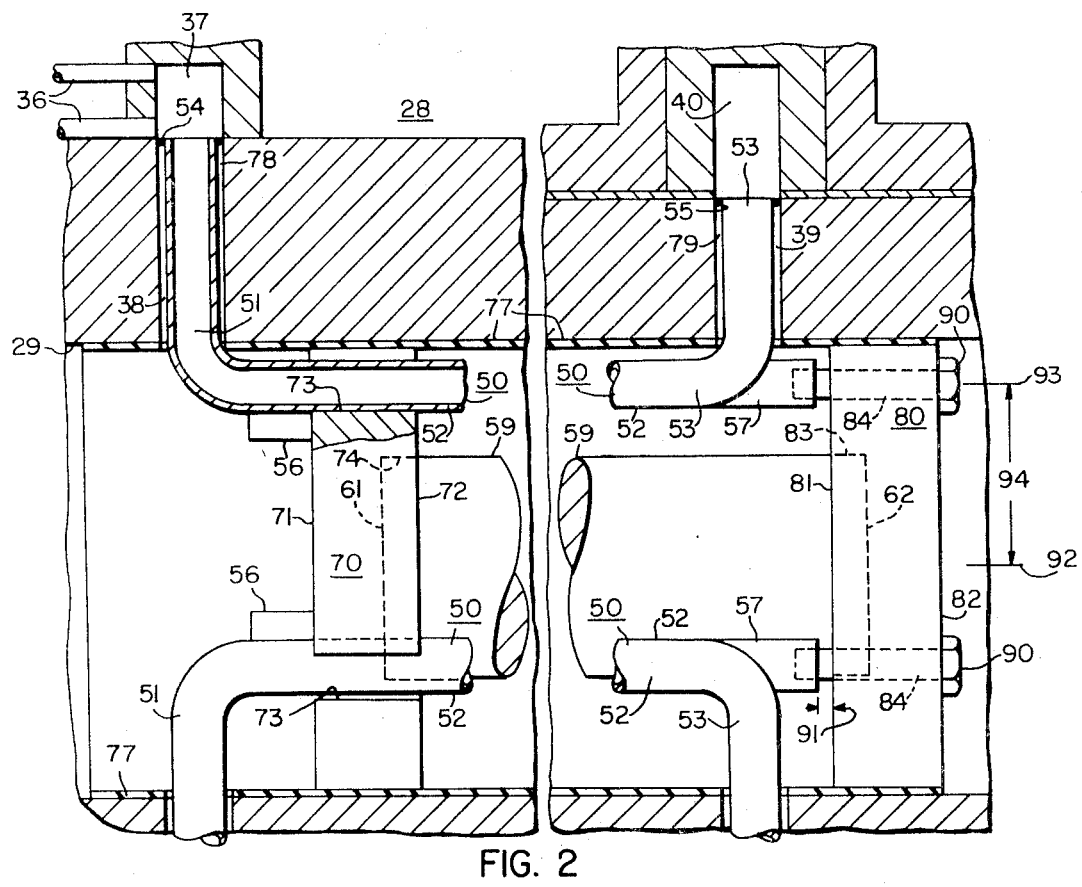
FIG. 2 is a detailed view, in longitudinal section, partly in elevation of the discharge end of a turbine generator, embodying the invention.

The right-hand end of the rotor, as best illustrated in FIG. 2, is the discharge end. The water flows from the rotor winding conductors through connectors 36 to a collection chamber 37 extending circumferentially around the surface of the rotor shaft 28. The connectors 35 and 36 at opposite ends of the winding 24 may be of similar construction and each connector includes an insulating section. Radial passages 38 connect the collection chamber 37 to the bore 29 and a second set of radial passages 39 connects the bore 29 to a discharge chamber 40 extending circumferentially around the surface of the rotor 28. The water is drained from the discharge chamber 40 as indicated at 41 for recirculation, any suitable type of sealing means being provided to prevent escape of water.

A corrosion resistant stainless steel tube 50 connects the collection chamber 37 to the discharge chamber 40. The stainless steel tube 50 is comprised of a first radial portion 51, an axial portion 52, and a second radial portion 53. The first radial portion 51 is connected in any convenient manner to the collection chamber 37, as indicated by a weld 54. The second radial portion 53 is connected in any convenient manner to the discharge chamber 40, as indicated by a weld 55.

A stop member 56 is mounted on the axial portion 52 of the stainless steel tube 50, adjacent to the first radial portion 51. A tightening lug 57 is mounted on the axial portion 52 of the stainless tube 52 adjacent to the second radial portion 53. Although this embodiment of the invention shows three stainless steel tubes 50, it is understood that the number of stainless steel tubes 50 depends on the number of radial passages 38 and 39 which comprise the set of radial passages described at those points. Any convenient number of radial passages and stainless steel tubes may be used. The number of such tubes is dependent on various considerations, such as ease of fabrication, and the velocity of the water to be carried through the tubes. The stainless steel tubes are pre-stressed in tension against a brace member 59. The brace 59 is a solid longitudinal bar, centrally and axially disposed through the bore 29. The brace 59 is composed of material having a low coefficient of thermal expansion, such as the material sold under the trade name INVAR. The brace 59 has a first end 61 and a second end 62. An end plate 70 and a clamp plate 80, lie at ends 61 and 62 of the brace 60, respectively.

Figure 3:
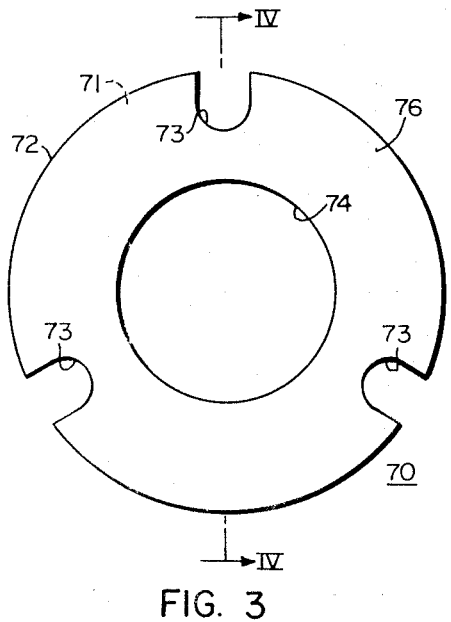
FIG. 3 is a detailed view of an end plate utilized in the invention.
Figure 4:
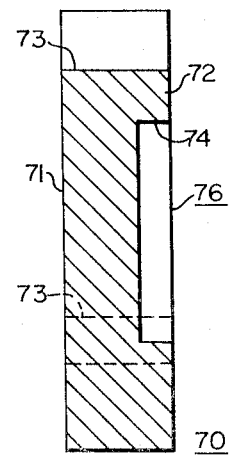
FIG. 4 is a sectional view, taken along section line IV—IV of FIG. 3, of an end plate utilized in the invention.

The end plate 70 (FIG. 3) is generally cylindrical in shape having a body portion 76, sides 71 and 72, and a plurality of slots 73 thereon. The number of slots 73 in the body portion 76 corresponds to the number of stainless steel tubes 50 utilized in the particular embodiment of the invention. The side 72 of the end plate 70 has a groove 74 therein. The dimensions of the groove 74 are determined by the dimensions of the brace 59 utilized in the particular embodiment of the invention. FIG. 4 is a sectional view of the end plate 70, taken along section lines IV—IV of FIG. 3.

Figure 5:
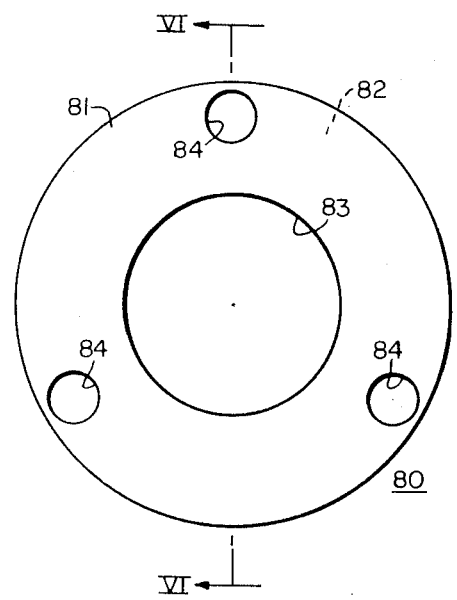
FIG. 5 is a detailed view of a clamp plate utilized in the invention.
Figure 6:
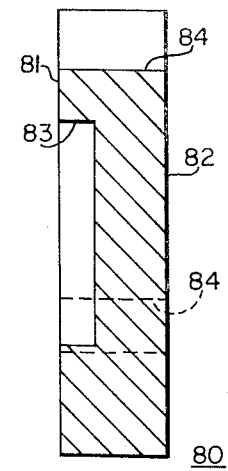
FIG. 6 is a sectional view, taken along section line VI—VI of FIG. 5, of a clamp plate utilized in the invention; and, FIG. 7 is a detailed view of a corrosion resistant member utilized in the invention.

The clamp plate 80, (FIG. 5) is generally cylindrical in shape having sides 81 and 82. The side 81 has a groove 83 therein. The dimensions of the groove 83 are dependent upon the dimensions of the brace 59 utilized in the particular embodiment of the invention. A plurality of openings 84 extend through the plate 80, and are disposed at a predetermined location, depending upon the number of the stainless steel tubes 50 utilized in this embodiment of the invention. FIG. 6 is a sectional view of the clamp plate 80, taken along section lines VI—VI of FIG. 5.

Referring again to FIG. 2, a typical embodiment of the invention is illustrated. The radial passage 38 extending from the collection chamber 37, and the radial passage 39 extending from the bore 29 to the discharge chamber 40 are illustrated. The stainless steel tube 50, having the first radial portion 51, the axial portion 52 and the second radial portion 53 is illustrated. The first radial portion 51 is shown inserted within the radial passage 38. The first radial portion 51 of the stainless steel tube 50 is connected to the collection chamber 37 as indicated by the weld 54. The second radial portion 53 of the stainless steel tube 50 is shown inserted within the radial passage 39. The second radial portion 53 of the stainless steel tube 50 is attached to the discharge chamber 40 as indicated by the weld 55. The method of fabrication of this embodiment of the invention is as follows. The stainless steel tube 50 is axially inserted into the right-hand end, as viewed on the drawing, of the rotor bore 29. The stainless steel tube 50 is axially inserted until the first radial portion 51 and the second radial portion 53 align with the radial passages 38 and 39, respectively. The first radial portion 51 is radially inserted into the radial passage 38, and the second radial portion 53 is radially inserted into the radial passage 39. The first radial portion 51 is then welded to the collection chamber 37 as is illustrated by the weld 54, and the second radial portion 53 is attached to the discharge passage 40 as indicated by the weld 55. The other stainless steel tubes are inserted in a similar manner. Ease of fabrication is one element considered when deciding how many stainless steel tubes are to be utilized in a given machine. When all of the stainless steel tubes 50 that are to be used in the particular application of the invention have been inserted into their respective radial passages 38 and 39, the end plate 70 is axially inserted into the shaft 29. As seen in FIG. 2, the stop member 56 is mounted on the axial portion 52 of the stainless steel tubes 50 adjacent to the first radial portion 51. The tightening lug member 57 is mounted on the axial portion 52 of the stainless steel tube 50 adjacent to the second radial passage 53. The end plate member 70 (FIG. 3) having sides 71 and 72 is then inserted so that each of the slots 73 straddle each of the plurality of stainless steel tubes 50 as utilized in this particular embodiment of the invention. The end plate 70 is axially inserted into the bore 29 until the body portion 76 of the end plate 70 abuts the stop member 56 which is mounted on the axial portion 52 of the stainless steel tube 50. The stop member 56 serves to secure the end plate 70 in the desired position. The brace 59 is then inserted into the axial bore 29 until the first end 61 of brace 59 becomes engaged in the groove 74 which is disposed on the side 72 of the end plate 70. The clamp plate member 80 is then inserted into the bore 29 of the rotor 28 so that the groove 83 on the side 81 of the clamp plate 80 engages the second end 62 of the brace 59.

The stainless steel tubes 50 are pre-stressed in tension against the bracing member 59 by means of the end plate 70, the clamp plate 80, and a threaded bolt 90. The threaded bolt 90 is inseted through one of the plurality of openings 84 which extends through clamp plate 80. The threaded bolt 90 is then threaded with a predetermined amount of torque into the tightening lug member 57 mounted on the axial portion 52 of the stainless steel tube 50. The stainless steel tube 50 is thereby pre-stressed in tension against the bracing member 59. The amount of tension is predetermined and is regulated by a space, indicated by arrow 91, which is left unoccupied between the tightening lug 57 and the clamp plate 80. The bore 29 is lined with an insulating member 77. The insulating member 77 provides a thermal barrier between the heated stainless steel tube 50 and the rotor steel of rotor 28. In the radial passages 38, an air gap 78 provides a sufficient thermal barrier between the rotor steel of rotor 28 and the first radial portion 51 of the stainless steel tube 50. In the radial passages 39, an air gap 79 provides a sufficient thermal barrier between the prior steel or rotor 28 and the second radial portion 53 of the stainless steel tube 50.

Figure 7:
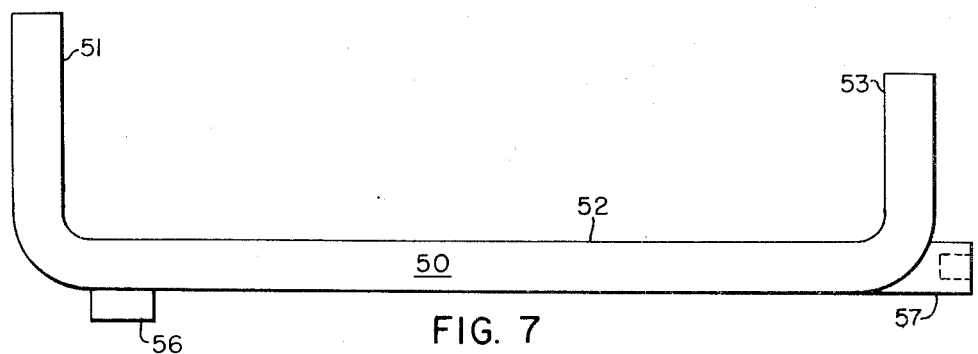

Referring to FIG. 7, a detailed view of the hollow stainless steel tube 50 is shown. The hollow stainless steel tube 50 connects the collection chamber 37 to the discharge chamber 40. The collection chamber 37 is connected to the rotor winding conductors by the connectors 36. The stainless steel tube 50 is comprised of the first radial portion 51, the axial portion 52, and the second radial portion 53. The first radial portion 51 is connected to the collection chamber 37 by the weld 54, while the second radial portion 53 is connected to the discharge chamber 40 by the weld 55.

The stop 56 is mounted on the axial portion 52 of the stainless steel tube 50, djacent to the first radial portion 51. The tightening lug 57 is mounted on the axial portion 52 adjacent to the second radial portion 53.

One of the advantages of utilizing the stainless steel tube 50 to transmit the coolant fluid from the annular chamber 37 to the discharge chamber 40 by means of the stainless steel tube 50 is the elimination of a weld, required in the prior art, between the stainless steel liners which extend radially through the radial passages 38 and 39 and between a stainless steel liner which was disposed along the interior of the shaft bore 29. By eliminating the weld on the interior of the rotor, fabrication of the rotor is simplified. Another advantage of utilization of the stainless steel tube as taught by this invention is that a useful differential pressure within the interior of the generator is obtained. Using the stainless steel tube 50, it is observed that the water is transmitted along an axis 93 of the longitudinal portion 52 of the stainless steel tube 50. It will be observed that the axis 93 of tube 51 is disposed a radial distance 94 from an axis 92 of the bore 29. This displacement of fluid flow along the axis 93 from the axis 92 provides the useful differential pressure that is able to be utilized within the interior of the generator.

Thus in summary, it has been seen that the use of a stainless steel pre-shaped tube to transmit the heated water from the collection chamber to the discharge chamber has resulted in an advantage over the prior art which utilized stainless steel liners through the radial and axial portions of the rotor shaft which came in contact with the heated water. By pre-stressing the stainless steel tube in tension against a bracing member the differential thermal expansion of the stainless steel tube due to heating caused by water passing therethrough has been held to a tolerable level.

We claim as our invention:

1. A rotor for a dynamoelectric machine comprising:

a body portion having windings thereon, said windings having passages for circulation of a fluid coolant extending therethrough;

a shaft portion having a central axial bore extending therethrough, a coolant collection chamber connected to said shaft, a coolant discharge chamber connected to said shaft, said shaft having a first radial passage connecting said bore to said collection chamber, said shaft having a second radial passage axially spaced from said first radial passage connecting said bore to said discharge chamber;

means for connecting said collection chamber to the passages extending through said windings;

a hollow corrosion resistant member connecting said collection chamber to said discharge chamber, said hollow corrosion resistant member comprising a first radial portion, a second radial portion, and an axial portion connecting said first radial portion to said second radial portion; and, means for pre-stressing said corrosion resistant member.

2. A rotor for a dynamoelectric machine comprising:

a body portion having windings thereon, said windings having passages for circulation of a fluid coolant extending therethrough;

a shaft portion having a central axial bore extending therethrough, a coolant collection chamber connected to said shaft, a coolant discharge chamber connected to said shaft, said shaft having a first radial passage connecting said bore to said collection chamber, said shaft having a second radial passage axially spaced from said first radial passage connecting said bore to said discharge chamber;

means for connecting said collection chamber to the passages extending through said windings;

a hollow corrosion resistant member connecting said collection chamber to said discharge chamber; and, means for pre-stressing said corrosion resistant member, said means comprising: a bracing member; an end plate member; a clamp plate member having an opening therethrough, said end plate member and said clamp plate member being disposed at opposite ends of said bracing member; and, a bolt having threads thereon, said bolt passing through the opening in said clamp plate member, said bolt being threaded into said corrosion resistant member with a predetermined amount of torque, said bolt thereby pre-stressing said corrosion resistant member against said bracing member.

3. The rotor of claim 2, wherein said corrosion resistant member comprises;

a first radial portion, a second radial portion and an axial portion connecting said first radial portion to said second radial portion, a stop member mounted on said axial portion adjacent to said first radial portion, and, a tightening lug member mounted on said axial portion adjacent to said second radial portion, and wherein said bracing member has a first end and a second end, said end plate member has a groove therein, said end plate member abutting said stop member, said clamp plate member has a groove therein, said end plate member and said clamp plate member being disposed at opposite ends of said bracing member so that the groove in said end plate member engages the first end of said bracing member and the groove in said clamp plate member engages the second end of said bracing member, said bolt being threaded into said tightening lug member.

4. The rotor of claim 2, wherein said hollow corrosion resistant member is fabricated from stainless steel.

5. The rotor of claim 2, wherein said bracing member comprises a solid longitudinal bar, said bar extending centrally and axially through said bore.

6. The rotor of claim 2, wherein said bracing member is fabricated of material having a low coefficient of thermal expansion.

7. The rotor of claim 2, wherein three corrosion resistant members are disposed therein.

* * * * *